L. H. DOYLE.
Cultivator.
No. 37,089.  Patented Dec. 9, 1862.
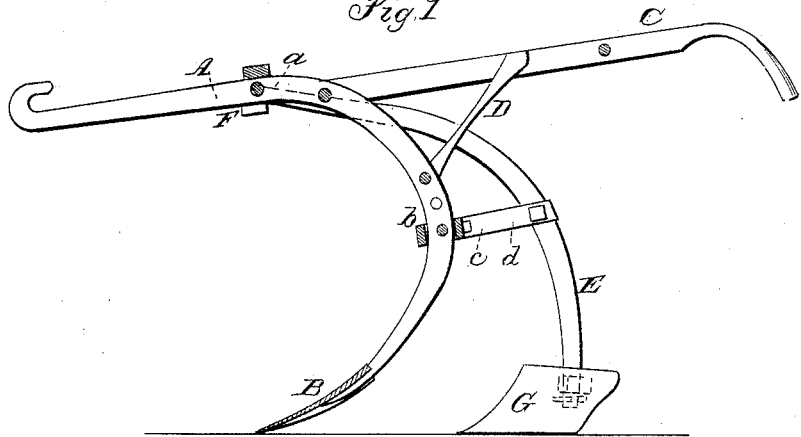
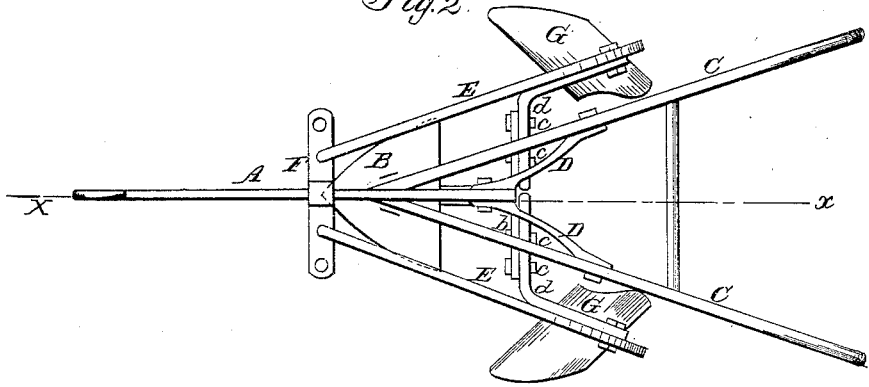
Witnesses
J W Coombs
G W Reed
Inventor
L H Doyle
per Munn & Co

UNITED STATES PATENT OFFICE.

L. H. DOYLE, OF WATERLOO, IOWA.

IMPROVEMENT IN CULTIVATORS.

Specification forming part of Letters Patent No. 37,089, dated December 9, 1862.

*To all whom it may concern:*

Be it known that I, L. H. DOYLE, of Waterloo, in the county of Black Hawk and State of Iowa, have invented a new and Improved Cultivator; and I do hereby declare that the following is a full, clear, and exact description of the same, reference being had to the accompanying drawings, making a part of this specification, in which—

Figure 1 is a side sectional view of my invention, taken in the line $x\ x$, Fig. 2. Fig. 2 is a plan or top view of the same.

Similar letters of reference indicate corresponding parts in the two figures.

The object of this invention is to obtain a strong and durable cultivator of iron, which will be light and capable of being readily adjusted or expanded and contracted laterally to suit the width of the rows of plants under cultivation.

The invention consists in a novel construction of the frame of the device, as hereinafter fully shown and described, whereby the desired end is attained.

To enable those skilled in the art to fully understand and construct my invention, I will proceed to describe it.

A represents a curved iron bar, to the front end of which the draft-hook is attached. The front part of this bar is nearly horizontal, but the back part is curved nearly in semicircular form, as shown in Fig. 1, and forms a foot or standard for a shovel-share, B. To this bar A two wooden handles, C C, are attached, and braced by rods D D, as shown clearly in Fig. 2.

E E are two curved iron bars, the front ends of which are bent downward in hook form, and are fitted in a yoke, F, which is placed on the bar A and secured thereto by a bolt, $a$. This yoke F is made of a straight metal bar bent in loop form at its center to form a recess to receive the bar A, the bolt $a$ passing through the loop and said bar.

To the bar A there is secured a bar, $b$, which projects laterally from it, one at each side, and to this bar $b$ there are secured, by bolts $c\ c$, angle-bars $d\ d$, which are bolted to the bars E E. The bars $b$ and $d\ d$ serve to secure the bars E E in proper position, and the bars $d\ d$ are provided with a series of holes each, through any of which the bolts $c\ c$ may pass, and the bars E E secured at a greater or less distance apart at their back ends, as may be desired, the front ends of said bars turning in the yoke F. To the back ends of the bars E E shares G G are attached, one to each, and the bars E E have an oblique position with each other, as shown clearly in Fig. 2.

The yoke F may have two or more holes made in it near each end, in order that the front ends of the bars E E may be adjusted in it nearer together or farther apart, as may be desired.

The bar $b$ may be secured at different heights on the bar A, in order to raise or lower the shares G G, and the yoke F may be inserted or secured to the under side of bar A, in order to vary the height of the bars E E. This adjustment of the yoke F, in connection with the adjustment of the bar $b$, admits of the shares G G being secured at different heights, as circumstances may require.

The shares G G may also be secured to the bars E E in such a manner as to admit of having a greater or less pitch, as desired.

I do not claim an expanding cultivator, for they are an old and well-known device and have been arranged in various ways; but I do claim as new and desire to secure by Letters Patent—

The combination, with the beam-bar A and standards E E, of the adjusting-bars $b\ d$, in the manner herein shown and described.

L. H. DOYLE.

Witnesses:
 DAVID EDWARDS,
 GEO. W. MILLER.